United States Patent [19]

Schultz et al.

[11] Patent Number: 5,640,753
[45] Date of Patent: Jun. 24, 1997

[54] METHOD OF FABRICATING AN INVERTED MAGNETORESISTIVE HEAD

[75] Inventors: Allan E. Schultz, St. Paul; Frank S. Stageberg, Edina; Kenneth P. Ash, Chanhassen; Brian S. Zak, Excelsior, all of Minn.

[73] Assignee: Seagate Technology, Inc., Scotts Valley, Calif.

[21] Appl. No.: 477,290

[22] Filed: Jun. 7, 1995

Related U.S. Application Data

[63] Continuation-in-part of Ser. No. 206,007, Mar. 3, 1994, abandoned.

[51] Int. Cl.⁶ ................................. G11B 5/127
[52] U.S. Cl. .................. 29/603.08; 29/603.11; 29/603.13; 29/603.15; 29/603.16; 29/603.27; 360/113
[58] Field of Search .............. 29/603.08, 603.11, 29/603.13, 603.15, 603.16, 603.27; 360/113

[56] References Cited

U.S. PATENT DOCUMENTS

| | | | |
|---|---|---|---|
| 4,782,414 | 11/1988 | Krounbi et al. | 360/113 |
| 4,803,580 | 2/1989 | Mowry | 360/113 |
| 4,816,947 | 3/1989 | Vinal et al. | 360/113 |
| 4,875,987 | 10/1989 | Wada et al. | 29/603.13 X |
| 4,891,725 | 1/1990 | Mowry | 360/113 |
| 4,940,511 | 7/1990 | Fontana, Jr. et al. | 156/656 |
| 5,130,877 | 7/1992 | Hsie et al. | 360/126 |
| 5,141,623 | 8/1992 | Cohen et al. | 29/603.15 X |
| 5,155,643 | 10/1992 | Jones, Jr. et al. | 360/113 |
| 5,155,646 | 10/1992 | Fujisawa et al. | 360/126 |
| 5,168,409 | 12/1992 | Koyama et al. | 360/113 |
| 5,227,212 | 7/1993 | Ahlert et al. | 360/113 |
| 5,256,249 | 10/1993 | Hsie et al. | 156/656 |
| 5,274,520 | 12/1993 | Matsuzono et al. | 360/113 |

FOREIGN PATENT DOCUMENTS

| | | |
|---|---|---|
| 0 516 022 A2 | 5/1992 | European Pat. Off. . |
| 0 548 511 A1 | 11/1992 | European Pat. Off. . |
| 0 574 896 A2 | 6/1993 | European Pat. Off. . |
| 60-177420 | 2/1985 | Japan . |
| 60-50711 | 3/1985 | Japan . |
| 61-120318 | 6/1986 | Japan . |
| 1-96814 | 4/1989 | Japan . |
| 2-91807 | 3/1990 | Japan . |

OTHER PUBLICATIONS

Hanazono, M., et al., Fabrication of a Thin Film Head Using Polyimide Resin and Sputtered Ni-Fe Films, *Journal of Applied Physics*, vol. 53 (1982), No. 3, Part II, pp. 2608-2610.

*Primary Examiner*—S. Thomas Hughes
*Attorney, Agent, or Firm*—Kinney & Lange, P.A.

[57] ABSTRACT

A method of fabricating an inverted magnetoresistive head is disclosed. The method includes fabricating a writer. The writer includes a bottom pole positioned within a recessed substrate. The bottom pole is filled with copper coils and polymer. A write gap, a pole tip, and a top pole/bottom shield are fabricated on a portion of the polymer. A top surface of both the polymer and the write gap are planarized to provide a substantially smooth surface upon which a reader can be placed. The reader is fabricated on top of the writer and includes a first reader gap, a magnetoresistive element, a second reader gap, and a shield.

15 Claims, 9 Drawing Sheets

METHOD OF FABRICATING AN INVERTED MAGNETORESISTIVE HEAD

This application is in a continuation-in-part of commonly assigned U.S. patent application Ser. No. 08/206,007, filed Mar. 3, 1994, entitled "INVERTED MAGNETORESISTIVE HEAD", now abandoned.

Reference is made to the following commonly assigned application: U.S. patent application Ser. No. 08/484,696, filed on even date herewith, and now abandoned, entitled "INVERTED MAGNETORESISTIVE HEAD".

BACKGROUND OF THE INVENTION

The present invention relates to a method of fabricating a magnetoresistive head for high frequency, high data rate, and high track density applications, and in particular to a method of fabricating an inverted magnetoresistive head having the reader portion of the magnetoresistive head fabricated on top of the writer portion of the magnetoresistive head.

Standard magnetoresistive (MR) heads are fabricated with the writer portion fabricated on top of the reader portion. MR heads are used in magnetic storage systems to detect magnetically encoded information from a magnetic storage medium or disc and to write magnetically encoded information to the storage medium. In a read mode, a time dependent magnetic field associated with a transition from a magnetic storage medium directly modulates the resistivity of an MR element. In operation, the change in resistance of the MR element can be detected by passing a sense current through the MR element and measuring the voltage across the MR element. The resulting signal can be used to recover information or data from the magnetic storage medium.

Practical MR elements are typically formed using ferromagnetic metal alloys because of their high magnetic permeability, an example of which is nickel iron (NiFe). A ferromagnetic material is deposited in a thin film upon the surface of an electrically insulated substrate or wafer. Changing magnetic fields originating from the magnetic storage medium produce a change in the magnetization direction of the MR element and thereby change the resistance of the sensor. This phenomenon is called the MR effect.

The element itself comprises a strip of MR material deposited on a magnetic shield layer to form an MR element. A series of depositions and etching processes form an active region from a portion of the MR element. The active region is the area of the MR element that senses changing magnetic fields from the magnetic storage medium. Changing magnetic fields produce a change in the resistivity of the MR element. Typical resistivity changes are on the order of 0.5 percent to 2.0 percent change. An upper magnetic shield acts as a barrier between the MR element and the surface of the magnetic storage medium to prevent changing magnetic fields associated with transitions passing by the head from linking back to the element. The magnetic shield also serves to protect the element from receiving stray magnetic fields associated with transitions from surrounding magnetic storage media.

Giant MR (GMR) sensors formed from GMR materials are the new line in the family of MR sensors. GMR sensors are formed from GMR elements, which are multi-layered structures. These devices include either layers of ferromagnetic and non-ferro magnetic films for a similar set of films. Permalloy may or may not be part of the layered pattern. In GMR sensors, the change is resistivity can be in excess of 65 percent.

One problem which affects performance of MR heads is the degree to which surfaces in the head can be fabricated flat or "planarized." In particular, in prior art heads, the top shield of an MR sensor has a dip just above the active region of the MR element. This degrades off track performance. Lack of planarization can also cause an electrical short between various layers of the head, such as between the contacts to the MR element and the top shield or between the top shield and subsequent fabricated layers. In addition, the bottom shield is usually fabricated from sendust or other high permeability magnetic materials, which is relatively rough for a thin film. This relatively rough surface can also cause shorting problems between the bottom shield and the contact film. Attempts at planarizing MR readers have focused on smoothing the bottom shield, planarizing the insulator above the MR sensor, or smoothing the top shield. These steps take additional process time and can limit design flexibility.

Another problem which affects performance of MR heads is that GMR heads are susceptible to interdiffusion among the extremely thin layers of a GMR head during a polymer cure, even when a low temperature polymer cure is utilized. This interdiffusion can destroy the effectiveness of the GMR head.

SUMMARY OF THE INVENTION

The present invention is a method of manufacturing an inverted magnetoresistive head for reading magnetically stored information from a magnetic storage medium. The method includes fabricating a bottom pole in a recessed portion of a basecoat, which distal from an air bearing surface of the magnetoresistive head. A polymer insulator and connective coils are positioned above the bottom pole. A top surface of the polymer insulator is planarized. A write gap is fabricated on top of the top surface of the polymer. A top surface of the write gap is planarized. A pole tip of magnetic high moment material is formed in the write gap proximal to the air bearing surface. A top pole/bottom shield is fabricated on top of the pole tip and the write gap. The top pole/bottom shield is planarized. A first reader gap is fabricated on top of the top pole/bottom shield. A magnetoresistive element is formed on top of a portion of the first reader gap proximal to the air bearing surface. Electrical contacts are fabricated on top of a top portion of the first reader gap, the electrical contacts electrically connecting the magnetoresistive element to a region outside of the magnetoresistive head. A second read gap layer is fabricated on top of the electrical contacts and the magnetoresistive element. A top shield is fabricated on top of the second reader gap. Finally, an overcoat of oxide is fabricated on top of the top shield.

DETAILED DESCRIPTION OF THE PREFERRED EMBODIMENTS

Figure 1A:
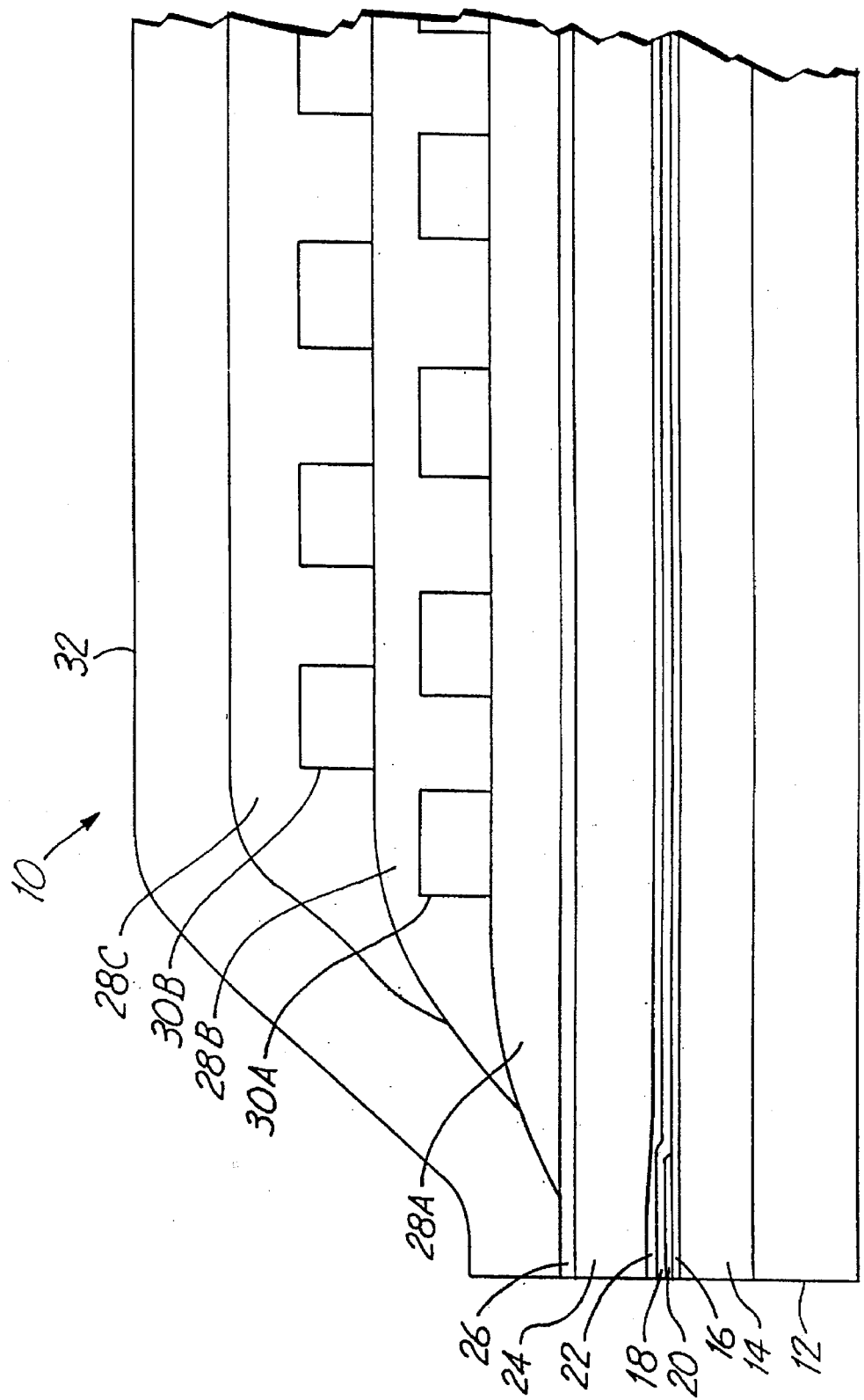
FIG. 1A is a layer diagram view of the layer structure of a prior art magnetoresistive head.

FIG. 1A is a cross-sectional view of the layer structure of prior art magnetoresistive (MR) head 10. MR head 10 of FIG. 1 illustrates a standard MR head having the writer portion of the head positioned on top of the reader portion of the head. MR head 10 includes basecoat oxide 12, bottom shield 14, first reader gap oxide layer 16, electrical contacts 18, MR element 20, second reader gap oxide layer 22, top shield/bottom pole 24, write gap oxide layer 26, polymer insulator layers 28a, 28b, and 28c, conductive coil layers 30a and 30b, and top pole 32.

Bottom shield 14 is deposited upon basecoat oxide 12. First read gap oxide layer 16 is then deposited upon bottom shield 14. Next, MR element 20 is deposited in a magnetic field and patterned. MR element 20 is the portion of MR head 10 which senses a magnetic field associated with a transition from a magnetic storage medium during a read operation. Electrical contacts 18 are then deposited on MR element 20 and first read gap oxide layer 16. Second read gap oxide layer 22 is then deposited. The two oxide layers, 16 and 22, comprise the read gaps, inside which MR element 20 is fabricated. Next, top shield/bottom pole 24 is laid down. Top shield/bottom pole 24 is normally utilized to provide the top shield of the reader portion of MR head 10 as well as the bottom pole of the writer portion of MR head 10.

Write gap oxide layer 26 is deposited, followed by polymer insulator layer 28a, conductive coil layer 30a, polymer insulator layer 28b, conductive coil layer 30b, and polymer insulator layer 28c. Finally, top pole 32 is deposited to complete the fabrication of MR head 10. Top shield/bottom pole 24 and top pole 32 provide the writing capability of MR head 10 during a write operation. The number of conductive coils 30 and polymer insulator layers 28 are determined by design and affect the inductance capabilities of the writer portion of MR head 10. Each polymer insulator layer, however, must be cured at temperatures between 200° C. and 400° C. for varying lengths of time depending upon the specific polymer. Only the lower half of this temperature range for the curing process will avoid possible degradation of the magnetics of the reader portion of MR head 10. In addition, any cure temperature above 200° C. will degrade the magnetics of a GMR device. This limits the choice of polymers available as insulators for MR head readers.

Figure 1B:
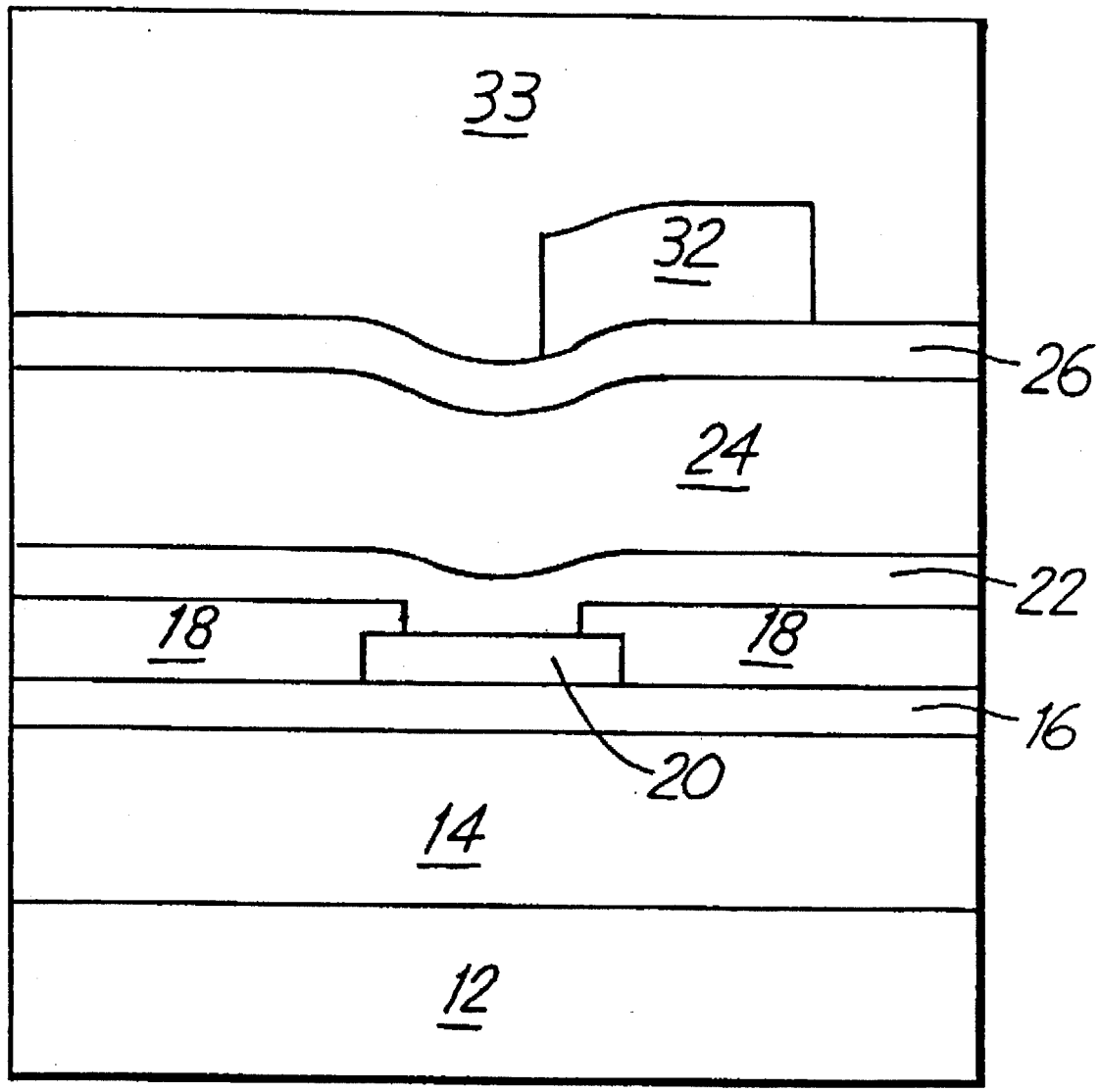
FIG. 1B is a layer diagram view showing the layer structure of the air bearing surface of a prior art magnetoresistive head.

As shown in FIG. 1B, MR head 10 is fabricated such that a top surface of second read gap oxide layer 22 is not flat or planarized. The non-planar surface of second read gap oxide layer 22 dictates that subsequent deposited layers of MR head 10 are also not flat or planarized. In particular, top pole 32, which is covered by overcoat oxide layer 33, can be offset from the center of MR head 10, which can degrade the quality of tracks written from MR head 10. In addition, it is desired that each deposited layer of MR head 10 is flat or planarized to prevent shorting of later deposited layers, thereby rendering MR head 10 inoperable.

Figure 2:
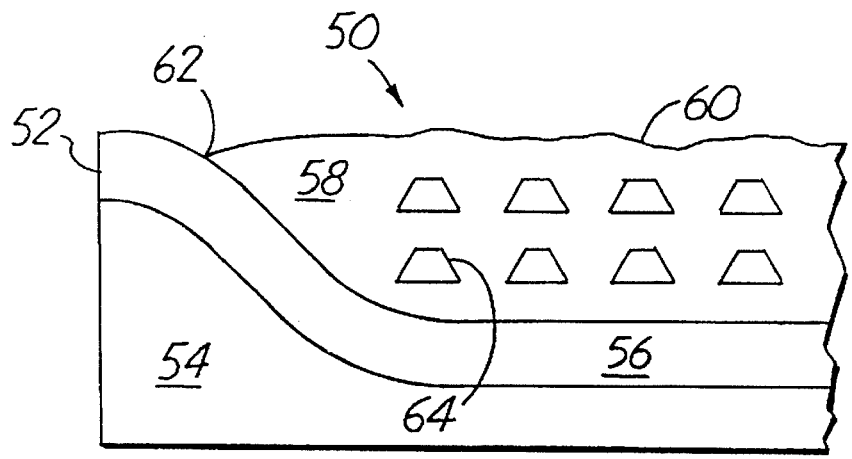
FIG. 2 is a layer diagram view of the layer structure of a bottom pole of a writer of a magnetoresistive head prior to planarization.

FIG. 2 is a cross-sectional view showing the layer structure near air bearing surface 52 of bottom pole 56 used in the present invention. Inverted MR head 50 includes base coat 54, bottom pole 56, polymer insulator 58 having top surface 60 and dip 62, and conductive coils 64.

In one preferred embodiment, in order to fabricate inverted MR head 50 of the present invention, bottom pole 56, formed from plated permalloy, is initially deposited into a recessed portion of basecoat 54. The recess in basecoat 54 is formed through a combination of chemical etching and ion milling. Polymer insulator 58 and conductive coils 64 fill the portion above bottom pole 56. Conductive coils 64, which are typically made of copper, can be positioned in polymer insulator 58 in one row, or as seen in FIG. 2, conductive coils 64 can be positioned in a plurality of rows. The number of conductive coils 64 and polymer insulator layers 58 affects the inductance capabilities of the writer portion of inverted MR head 50.

As shown in FIG. 2, top surface 60 of polymer insulator 58 can be somewhat irregular. Dip 62 can arise due to loss of polymer volume during the curing process. In the present invention, it is critical that top surface 60 of polymer insulator 58 be flat or planarized so that the remaining layers of inverted MR head 50 which are deposited on top of top surface 60 are deposited on a flat surface. Thus, any rough, jagged portions of top surface 60, including dip 62, must be eliminated.

Figure 3:
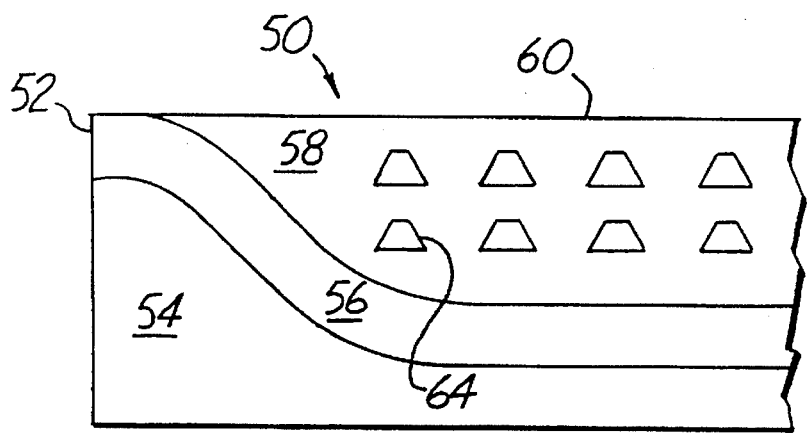
FIG. 3 is a layer diagram view of the layer structure of a bottom pole of a writer of a magnetoresistive head after planarization.

As shown in FIG. 3, all jagged and rough portions of top surface 60, including dip 62, have been eliminated. This elimination is normally done in one of two ways. First, the polymer material forming polymer insulator 58 can be deposited such that top surface 60 is higher than bottom pole 56. Top surface 60 can then undergo both a blanket reactive ion etch-back process and/or a chemical-mechanical polish until top surface 60 of polymer insulator 58 is both smooth and level with bottom pole 56. Second, the polymer material forming polymer insulator 58 can be deposited having rough top surface 60 and dip 62 (shown in FIG. 2). A layer of silica can be deposited such that the top surface of the silica layer is slightly above bottom pole 56. Then, photoresist is deposited on top of the silica layer. When the photoresist hardens, it will be perfectly level due to surface tension. The photoresist and silica layer can then undergo a blanket reactive ion etch-back process that removes the silica and photoresist at the same rate, until top surface 60 of polymer insulator 58 is both smooth and entirely flat.

Figure 4:
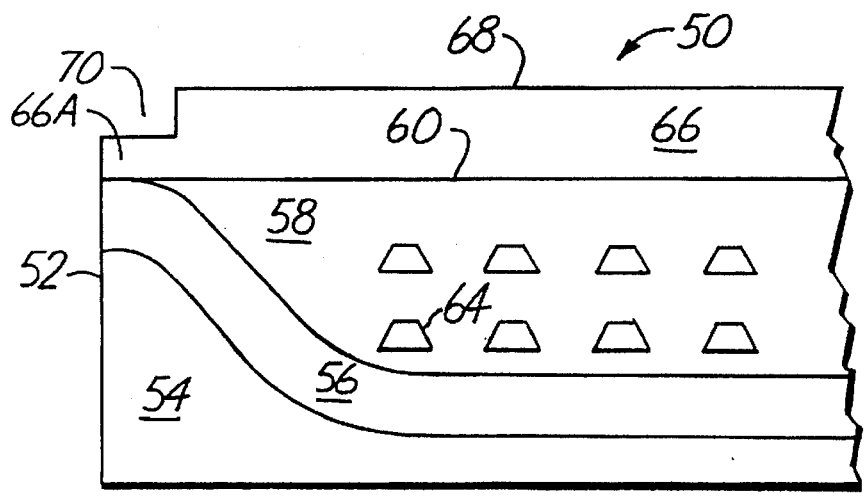
FIG. 4 is a layer diagram view of the layer structure of a bottom portion of a writer showing a recessed channel in the write gap.

As shown in FIG. 4, inverted MR head 50 further includes write gap oxide layer 66 having top surface 68 and channel 70. Write gap oxide layer 66 is deposited on top of top surface 60 of polymer insulator 58. Write gap oxide layer 66 can be formed from a variety of insulating materials, such as silica, alumina, or diamond-like carbon. Channel 70, located near air-beating surface 52, is then ion-milled into write gap oxide layer 66 to define actual write gap 66a beneath channel 70. This allows extremely accurate definition of the pole tip 72 (shown in FIGS. 5 and 6). The reason is that the photoresist is deposited upon a flat surface, allowing more precise development of the features in the photoresist mask. Write gap oxide layer 66a at air bearing surface 52 beneath channel 70 has a height in the range of approximately 0.1 to 1.0 microns, and preferably in the range of approximately 0.2 to 0.8 microns.

Figure 5:
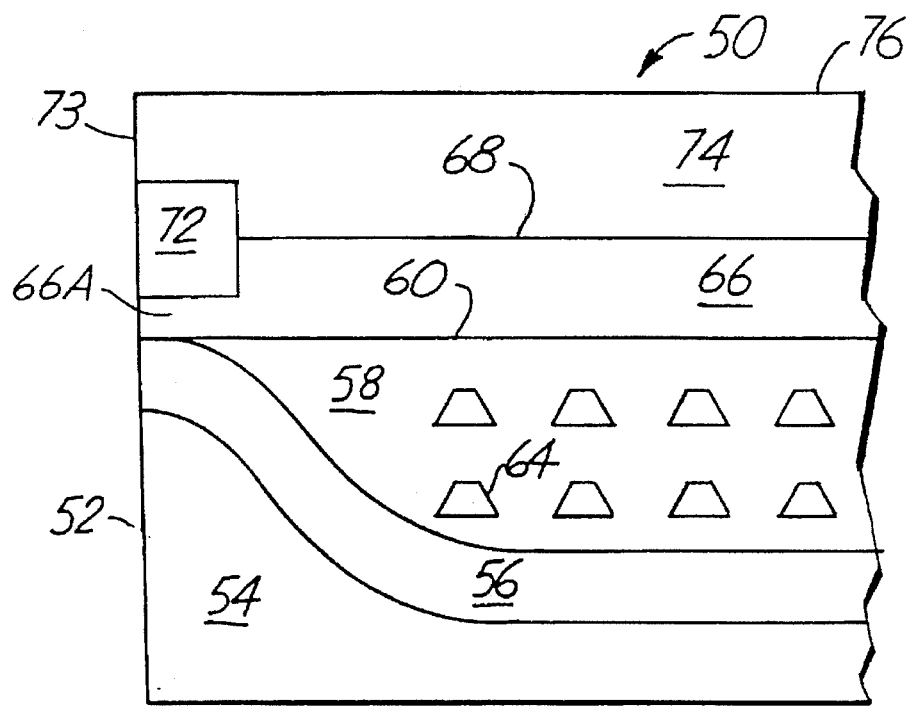
FIG. 5 is a layer diagram view of the layer structure of a writer of a magnetoresistive head.

As shown in FIG. 5, pole tip 72 is positioned at trailing edge 73 of air bearing surface 52 of inverted MR head 50. Pole tip 72 is an insert formed from a high moment magnetic material such as iron nitride or cobalt iron. A high moment magnetic material is capable of supporting a larger density flux than the permalloy used in standard MR heads. The high moment insert forming pole tip 72 concentrates the magnetic flux and allows writing of a narrow track.

The high momentum magnetic material forming pole tip 72 is either plated or sputtered into channel 70 until it is significantly higher than top surface 68 of write gap oxide layer 66. The thickness of the high moment insert depends upon the magnetic materials in the writer design. Typical values for the thickness of the insert range from 0.5 to 2.0 microns, and typical values for the track width of the pole tip range from 2.0 to 5.0 microns. In one preferred embodiment of the invention used for plated inserts such as cobalt iron ($Co_{90}$ $Fe_{10}$), a non-magnetic seed layer such as nickel vanadium ($Ni_{80}$ $V_{20}$) can be used, which then becomes part of the write gap. The protruding section of high moment material is then masked and permalloy is plated around it to obtain an approximately level surface. The masking above the insert is then removed and the entire shield is plated as a unit to the desired thickness. The top surface of the top pole 72/bottom shield 74 combination will very likely contain irregularities, which are then removed by chemical mechanical polishing.

Figure 6:
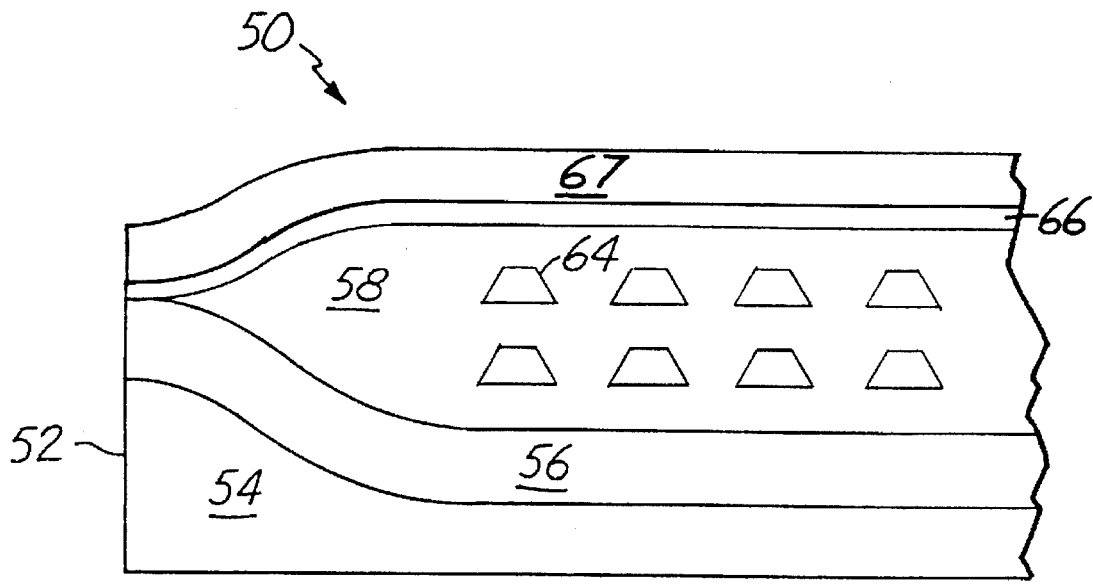
FIG. 6 is a layer diagram view of the layer structure of an alternate embodiment of a bottom portion of a writer showing a recess channel in the writer gap.
Figure 7:
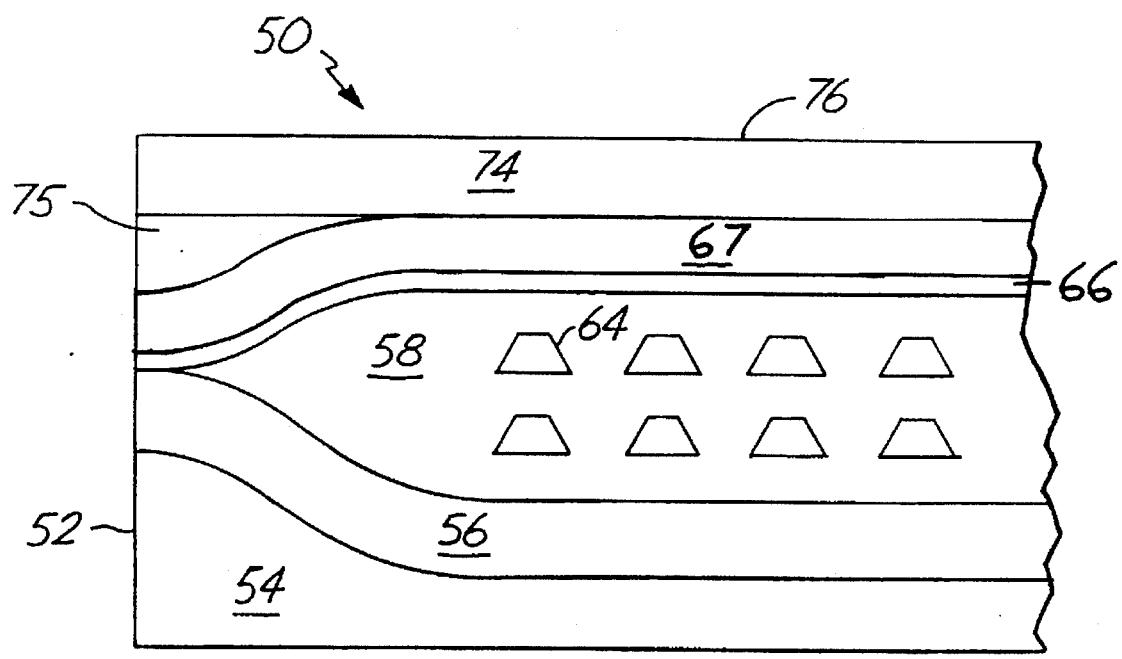
FIG. 7 is a layer diagram view of the layer structure of an alternate embodiment of a writer of a magnetoresistive head.

FIGS. 6 and 7 are layered diagrams of the layer structure of an alternate embodiment of the present invention. FIGS. 6 and 7 are similar to FIGS. 4 and 5. Therefore, similar layers and elements have been labeled with identical numbers. As shown in FIGS. 6 and 7, polymer insulator 58 is larger than that shown in FIGS. 4 and 5. Therefore, write gap oxide layer 66, deposited on top of polymer insulator 58, does not have a level top surface 68. In this embodiment, gap oxide layer 66 is much thinner distal to air bearing surface 52 than in the previous embodiment. Top pole 67 is fabricated on top of gap oxide layer 66. Top pole 67 may be a high moment material. Next, oxide 75 is deposited and planarized by methods previously discussed. Bottom shield 74 is then deposited on top of top pole 67 and oxide 75.

The alternate embodiment shown in FIGS. 6 and 7 provide a good definition zero throat. Good definition zero throat is necessary for proper performance.

Figure 8A:
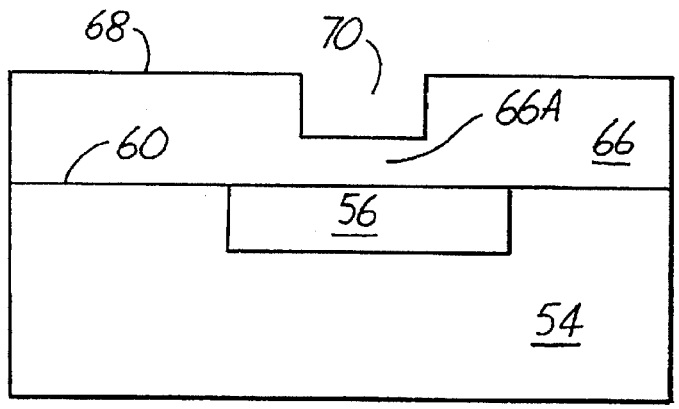
FIGS. 8A–8C are layered diagrams of the layer structure of an air bearing surface of a writer of a magnetoresistive head showing an alternate method of fabricating a pole tip.
Figure 8B:
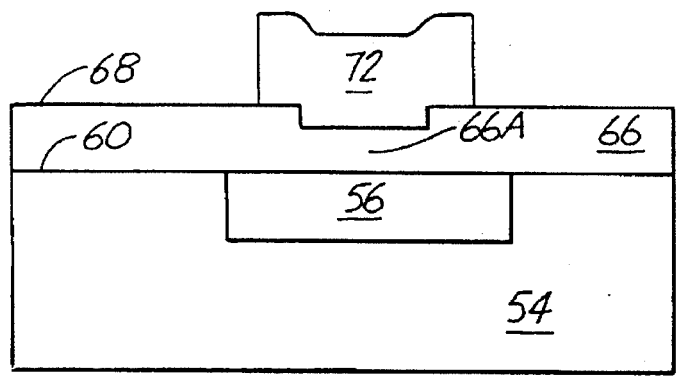
Figure 8C:
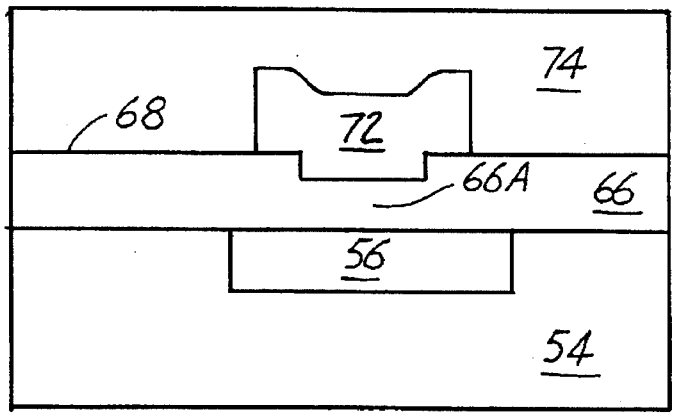
Figure 9A:
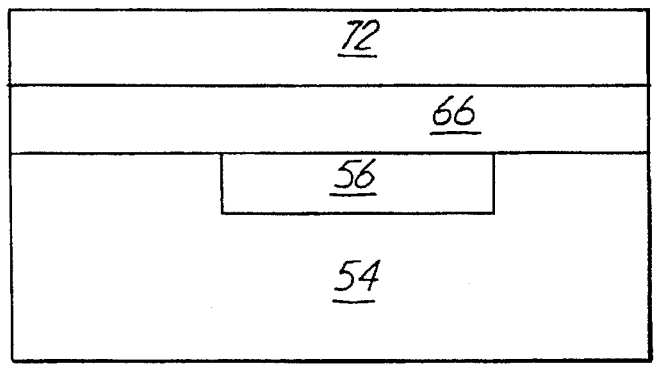
FIGS. 9A–9D are layered diagrams of the layer structure of the air bearing surface of a writer of a magnetoresistive head showing an alternate method of fabricating a pole tip.
Figure 9B:
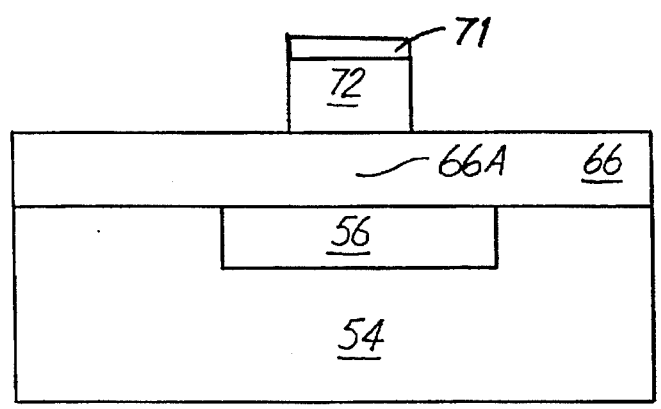
Figure 9C:
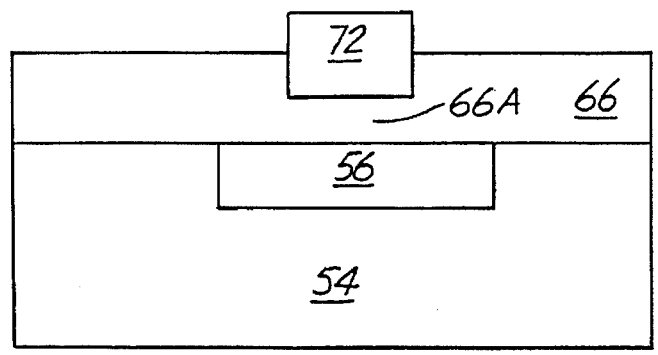
Figure 9D:
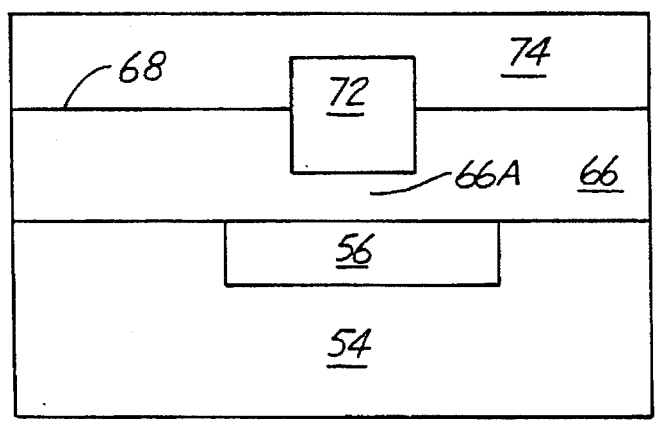

FIGS. 8A–8C are layered diagrams of the layer structure of a second alternate method of fabricating pole tip 72. In FIGS. 8A–8C, pole tip 72 is plated or sputtered into channel 70. The pole material forming pole tip 72 is then ion milled to provide the proper width of pole tip 72. Bottom shield 74 is then fabricated on top of pole tip 72 and top surface 68 of write gap oxide layer 66. Bottom shield 74 is then planarized.

FIGS. 9A–9D are layered diagrams showing a third alternate method of forming pole tip 72. As shown in FIGS. 9A–9D, a layer of high moment material is plated or sputtered on top of write gap oxide layer 66. These sides of pole tip 72 is then ion milled to provide the proper width of pole tip 72. Lift-off photoresist layer 71 can be put on top of pole tip 72 and additional oxide layer can be fabricated.

Bottom shield 74 is then be fabricated. Bottom shield 74 is then planarized.

Figure 10:
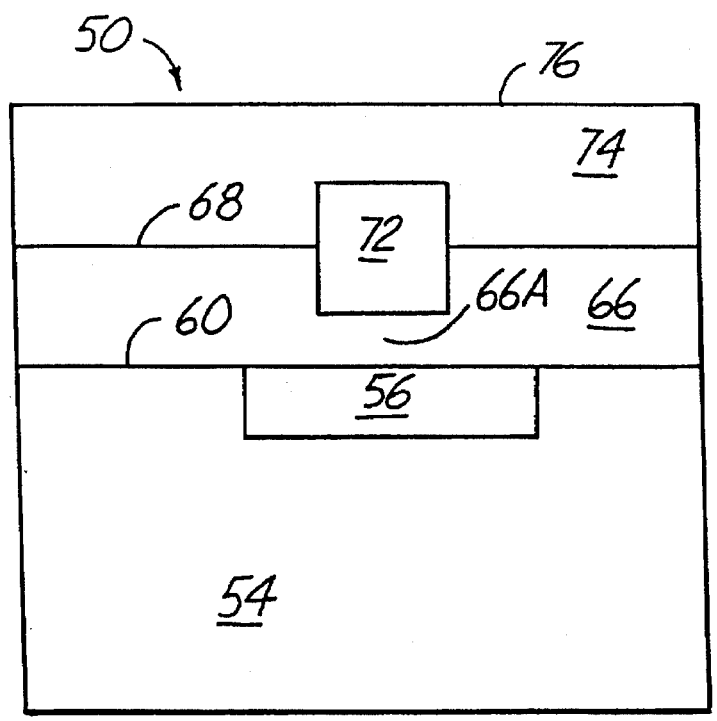
FIG. 10 is a cross-sectional view of the layer of the air bearing surface of a writer of a magnetoresistive head.

FIG. 10 is a layer diagram showing air bearing surface 52 of a writer of inverted MR head 50. As shown in FIG. 10, pole tip 72 is aligned above bottom pole 56; with the critical portion of write gap oxide layer 66A located between bottom pole 56 and pole tip 72. The distance between bottom pole 56 and pole tip 72, which is the critical distance of write gap oxide layer 66 is in the range of approximately 1,000 to 10,000 angstroms, and preferably in the range of approximately 2,000 to 8,000 angstroms. In one preferred embodiment, bottom pole 56 has a height in the range of approximately 2.0 to 4.0 micrometers, write gap oxide layer 66 formed between top surface 60 of polymer insulator 58 and top surface 68 has a height in the range of approximately 2,000 to 8,000 angstroms, pole tip 72 has a height in the range of approximately 5,000 to 20,000 angstroms, and bottom shield 74 between top surface 68 of write gap oxide layer 66 and top surface 76 of bottom shield 74 has a height in the range of approximately 1.5 to 4.0 micrometers.

Figure 11:
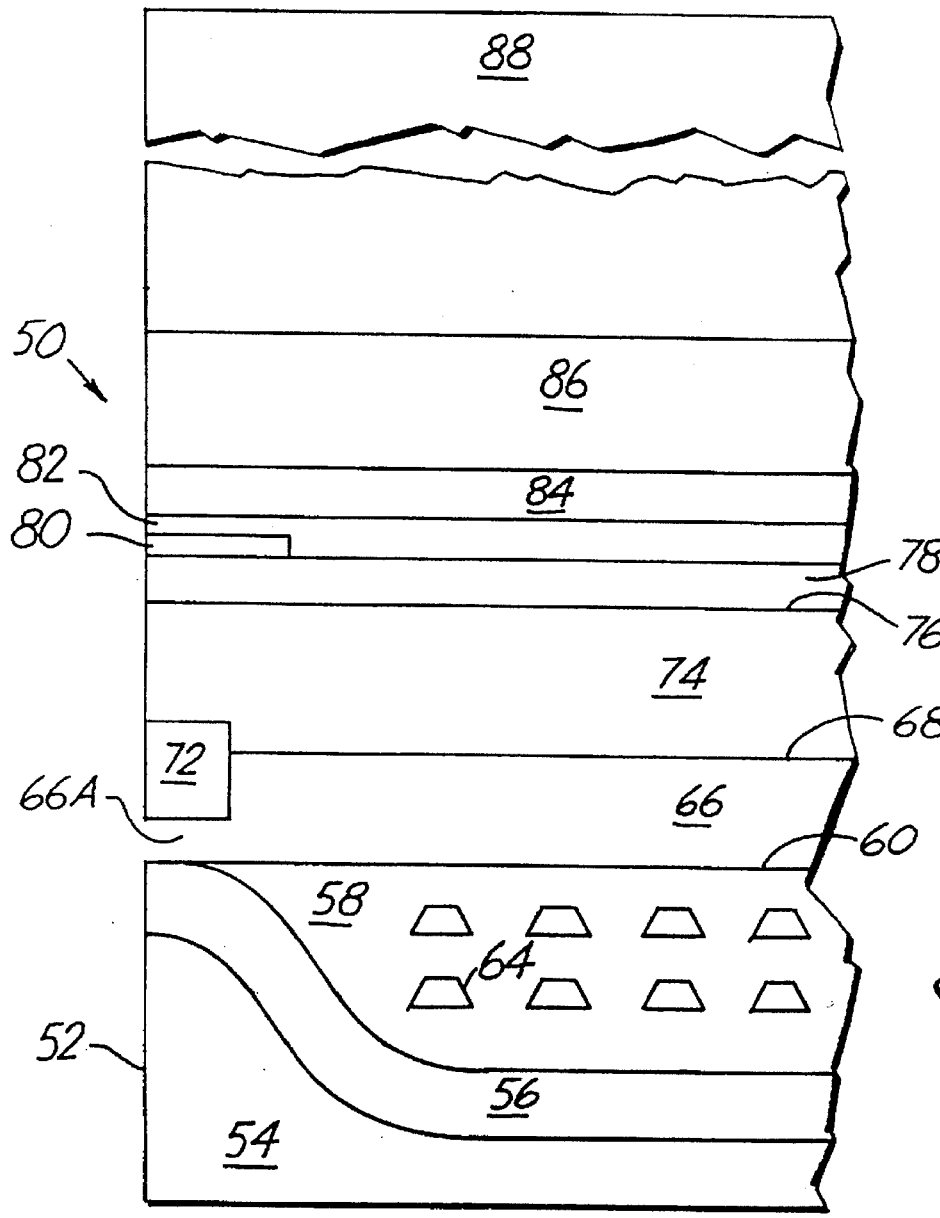
FIG. 11 is a cross-sectional view of the layer structure of a complete magnetoresistive head.

FIG. 11 is a layer diagram showing the entire fabricated inverted MR head 50, including both the writer and the reader portions of inverted MR head 50. Once bottom shield 74 has been deposited and planarized, the remaining layers of the reader can be deposited on the flat surface of bottom shield 74. Deposition on a series of flat surfaces alleviates shorting, which is a critical issue in standard MR heads.

Once the writer portion of inverted MR head 50 has been fabricated, first reader gap oxide layer 78 is deposited on top of bottom shield 74. In one preferred embodiment, first reader gap oxide layer 78 has a height of less than 4000 angstroms. MR element 80 is fabricated on first reader gap oxide layer 78 near trailing edge 73 of inverted MR head 50. MR element 80 may be a single film or composite film structure. The specific embodiment of MR element 80 does not affect the usefulness of present invention. Electrical contacts 82 are then deposited, followed by second reader gap oxide layer 84, top shield 86, and overcoat oxide layer 88. In one preferred embodiment, second reader gap oxide layer 84 has a height of less than 4000 angstroms. In addition, a boundary control stabilization layer, a permanent magnet stabilization layer, and/or an additional layer of contacts for inductive cancellation or low circuit resistance can be incorporated into the MR reader if necessary for a particular application.

Figure 12:
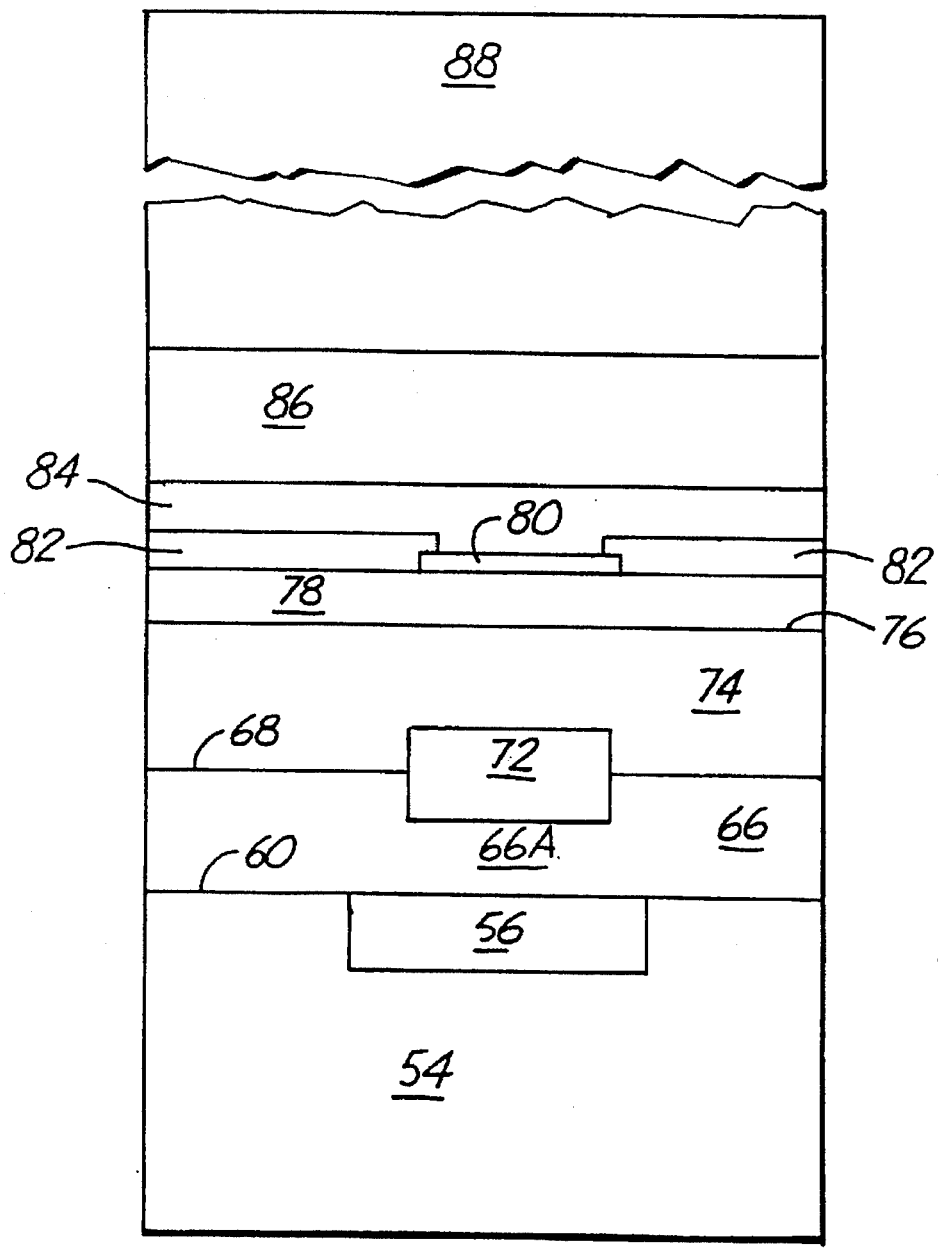
FIG. 12 is a cross-sectional view showing the layer structure of the air bearing surface of a complete magnetoresistive head.

FIG. 12 is a layer diagram of inverted MR head 50 showing both the reader and the writer. As shown in FIG. 12, bottom pole 56, top pole 72, and MR element 80 are aligned with one another. This invention improves the accuracy of the alignment of the MR sensor to the top pole, since there are only one or two intervening mask layers to complicate mask alignment, as compared to ten or more intervening mask layers in prior art non-inverted MR heads. The alignment of bottom pole 56, top pole 72, and MR element 80 is critical in forming an MR head which can both precisely read information from a magnetic storage medium and write information to the magnetic storage medium.

There are several advantages of inverted MR head 50 of the present invention. First, precise definition of the top pole is achieved. Second, the distance between MR element 80 and top pole 72 is substantially reduced over the prior art. This allows inverted MR head 50 to write higher linear densities on the disc. Third, planarity of the top pole allows the reader and the writer to be offset without the top pole having a dip in it, such as the dip of the prior art shown in FIG. 1B. Fourth, use of sendust or other rough films for the top shield will not cause shorting due to roughness, since the only film above the top shield surface is the overcoat. Fifth, building the writer prior to building the reader allows use of high temperature curing polymers such as polyimide and benzene cyclo-butene (BCB) without degrading the MR sensor magnetics or other properties. Sixth, building the writer prior to building the reader allows use of spin valves or giant MR sensors since high temperature polymer cures could cause interdiffusion among the extremely thin layers of giant MR sensors or spin valves, thus destroying their effectiveness. By having all high temperature cures completed before the reader portion is built, few restrictions are placed on the use of giant MR and/or spin valves sensors. In particular, the materials for the reader and writer can be optimized independently of each other to a much greater extent than the prior art.

Although the present invention has been described with reference to preferred embodiments, workers skilled in the art will recognize that changes may be made in form and detail without departing from the spirit and scope of the invention.

What is claimed is:

1. A method of manufacturing an inverted magnetoresistive head, the method comprising:

fabricating a bottom pole in a recessed portion of a basecoat distal from an air bearing surface of the head;

positioning a polymer insulator and conductive coils above the bottom pole;

planarizing a top surface of the polymer insulator;

fabricating a write gap on top of the top surface of the polymer;

forming a pole tip of high moment magnetic material in the write gap proximal to the air bearing surface;

planarizing a top surface of the write gap;

fabricating a top pole/bottom shield on top of the pole tip and the write gap;

fabricating a first reader gap on top of the top pole/bottom shield;

fabricating a first reader gap on top of the top pole/bottom shield;

forming a magnetoresistive element on top of a portion of the first reader gap proximal to the air bearing surface;

fabricating electrical contacts on top of a portion of the first reader gap, the electrical contacts electrically connecting the magnetoresistive element to a region outside of the inverted magnetoresistive head;

fabricating a second reader gap on top of the electrical contacts and the magnetoresistive element; and fabricating a top shield on top of the second reader gap.

2. The method of claim 1 wherein the step of fabricating a bottom pole further comprises:

plating polymer into the basecoat.

3. The method of claim 1 wherein the step of planarizing the top surface of the polymer insulator further comprises:

reactive ion etching the top surface of the polymer insulator until the top surface of the polymer insulator is substantially smooth.

4. The method of claim 1 wherein the step of planarizing the top surface of the polymer insulator further comprises:

polishing the top surface of the polymer insulator with a chemical-mechanical polish until the top surface of the polymer insulator is substantially smooth.

5. The method of claim 1 wherein the step of planarizing the top surface of the polymer insulator further comprises:

depositing a layer of silica on top of the top surface of the polymer insulator;

depositing a photoresist layer on top of the silica layer; and reactive ion etching the silica layer and the photoresist layer until the top surface of the polymer insulator is substantially smooth.

6. The method of claim 1 wherein the bottom pole is made of a plated permalloy.

7. The method of claim 1 wherein the write gap is formed from silica.

8. The method of claim 1 wherein the write gap is formed from diamond-like carbon.

9. The method of claim 1 wherein the write gap is formed from alumina.

10. The method of claim 1 and further comprising:

planarizing a top surface of the top pole/bottom shield.

11. The method of claim 1 wherein the step of forming a pole tip of high moment magnetic material in the write gap proximal to the air bearing surface further comprises:

ion-milling a channel into the write gap proximal to the air bearing surface;

plating the pole tip of high moment magnetic material into the channel such that a top surface of the pole tip is above a top surface of the write gap; and ion-milling a first and a second side of the pole tip to provide a proper width of the pole tip.

12. The method of claim 1 wherein the step of forming a pole tip of high moment magnetic material in the write gap proximal to the air bearing surface further comprises:

ion-milling a channel into the write gap proximal to the air bearing surface;

sputtering the pole tip of high moment magnetic material into the channel such that a top surface of the pole tip is above a top surface of the write gap; and ion-milling a first and a second side of the pole tip to provide a proper width of the pole tip.

13. The method of claim 1 wherein the step of forming a pole tip of high moment magnetic material in the write gap proximal to the air bearing surface further comprises:

fabricating a first write gap layer on top of the top surface of the polymer;

plating the pole tip on the top surface of the first write gap layer proximal to the air bearing surface such that a top surface of the pole tip lies in a first plane;

ion-milling a first and a second side of the pole tip to provide a proper width of the pole tip;

fabricating a lift-off photoresist layer on top of the pole tip;

fabricating a second write gap layer on top of the first write gap layer so that a top surface of the second write gap layer lies in the first plane;

removing the lift-off photoresist layer; and fabricating a third write gap layer on top of the second write gap layer and the pole tip.

14. The method of claim 1 wherein the step of forming a pole tip of high moment magnetic material in the write gap proximal to the air bearing surface further comprises:

fabricating a first write gap layer on top of the top surface of the polymer;

sputtering the pole tip on the top surface of the first write gap layer proximal to the air bearing surface such that a top surface of the pole tip lies in a first plane;

ion-milling a first and a second side of the pole tip to provide a proper width of the pole tip;

fabricating a lift-off photoresist layer on top of the pole tip;

fabricating a second write gap layer on top of the first write gap layer so that a top surface of the second write gap layer lies in the first plane;

removing the lift-off photoresist layer; and fabricating a third write gap layer on top of the second write gap layer and the pole tip.

15. A method of manufacturing an inverted magnetoresistive head, the method comprising:

fabricating a bottom pole in a recessed portion of a basecoat distal from an air bearing surface of the head;

positioning a polymer insulator and conductive coils above the bottom pole;

fabricating a write gap on top of the polymer insulator distal to the air bearing surface and positioned on top of the bottom pole proximal to the air bearing surface;

forming a top pole on top of the write gap;

fabricating an oxide layer on top of the top pole proximal to the air bearing surface;

planarizing a top surface of the oxide layer and a top surface of a portion of the top pole distal to the air bearing surface;

fabricating a bottom shield on top of the oxide layer and the top pole;

fabricating a first reader gap on top of the bottom shield;

forming a magnetoresistive element on top of a portion of the first reader gap proximal to the air bearing surface;

fabricating electrical contacts on top of a portion of the first reader gap, the electrical contacts electrically connecting the magnetoresistive element to a region outside of the inverted magnetoresistive head;

fabricating a second reader gap on top of the electrical contacts and the magnetoresistive element; and fabricating a top shield on top of the second reader gap.

* * * * *

UNITED STATES PATENT AND TRADEMARK OFFICE
CERTIFICATE OF CORRECTION

PATENT NO. : 5,640,753
DATED : JUNE 24, 1997
INVENTOR(S) :
ALLAN E. SCHULTZ, FRANK S. STAGEBERG, KENNETH P. ASH, BRIAN S. ZAK

It is certified that error appears in the above-indentified patent and that said Letters Patent is hereby corrected as shown below:

Col. 4, line 65, delete "air-beating", insert --air-bearing--

Col. 5, line 4, delete "beating", insert --bearing--

Signed and Sealed this

Sixteenth Day of December, 1997

Attest:

BRUCE LEHMAN

Attesting Officer

Commissioner of Patents and Trademarks